Aug. 28, 1962 — R. H. WIGHT — 3,051,039

PRESSURE PLATE FOR A PROJECTION PRINTING APPARATUS

Filed March 23, 1959

INVENTOR
RALPH H. WIGHT
BY
ATTORNEYS

United States Patent Office 3,051,039
Patented Aug. 28, 1962

3,051,039
PRESSURE PLATE FOR A PROJECTION PRINTING APPARATUS
Ralph H. Wight, Pittsburgh, Pa., assignor to J. W. Fecker, Inc., Pittsburgh, Pa., a corporation of Pennsylvania
Filed Mar. 23, 1959, Ser. No. 801,219
3 Claims. (Cl. 88—24)

This invention relates to photographic enlargers, projection printers, rectifiers and the like and more particularly to improvements in pressure-plate means for use with such apparatus.

In photographic enlargers, projection printers and the like of known constructions, and especially ones of larger sizes, it has been common practice heretofore to employ at the focal plane of a printer a pair of flat pieces of clear glass as pressure-plate means at opposite sides of the negative film to be copied and in such pressing engagement therewith that the film, even though same may be fairly stiff, will be held in a precisely flat condition at this focal plane of the copying objective of the apparatus during projection of the image carried on said film. It has also been common practice heretofore in connection with the sensitized photographic paper, copy negative or the like at the copying station of the apparatus to employ a relatively large flat piece of clear glass arranged to press downwardly upon the paper in such a manner as to insure that same will likewise be held in a precisely flat condition at the image plane of the objective during its exposure to the projected image.

In such earlier printer arrangements, the light travelling from the negative film to be copied to the sensitized paper at the copying station is required to pass through two pieces of glass; that is, the pressure plate underlying the negative film and the larger pressure plate overlying the light-sensitive sheet material. Since both of these plates of glass, of necessity, must have appreciable thickness in order to be able to exert the pressure required to maintain any and all kinds of commercially available films and sensitized papers flat, objectionable amounts of astigmatism and image distortion, have been introduced into the prints being produced thereby.

Although the above-mentioned optical aberrations at times in the past have been objectionable, particularly while using rectifying and transforming printers at relatively steep angles of tilt and attempting to obtain wide angle reproductions of high accuracy, nevertheless, these aberrations could not be conveniently avoided. It has been found, however, that by providing projection printing apparatus embodying improved pressure-plate means made in accordance with the present invention, printing errors due to such optical aberrations may be very materially reduced.

It is, accordingly, an object of the present invention to provide for use with photographic enlargers, projection printers and the like at least one and preferably two improved and especially formed transparent pressure plates for pressing the negative, or the sensitized copy sheet material or both as the case may be, into a flattened condition at the respective focal plane or focal planes of the apparatus; each improved pressure plate being in the form of a transparent no-power spherically curved meniscus glass or plastic element having a relatively long radius of curvature and of such reduced thickness that same while being pressed toward the photographic film, or the sensitized sheet material adjacent thereto, will be flexed into a more nearly flat condition and will, accordingly, exert the amount of pressure required for holding said film or sheet material against its back-up plate or support.

Other objects and advantages of the invention will become apparent from the detailed description which follows when taken in conjunction with the accompanying drawing in which.

The improved optical conditions which are obtained from the use of the improved pressure-plate means of the present invention result from the fact that the more obliquely directed image-forming light rays in passing from points in the image on film at the first focal plane of the objective to the sensitized copy paper or sheet material at the second or conjugate focal plane of the objective are required to travel through materially lesser thicknesses of glass or plastic material forming the pressure plates and, accordingly, experience lesser amounts of refraction or deviation than previously. Accordingly, lesser amounts of astigmatism and distortion result. These aberrations will be discussed in greater detail hereinafter.

There are many and varied uses to which photographic enlargers, projection printing apparatus and the like may be put. One common use for such apparatus, and wherein a very high degree of printing occuracy is desirable, is that referred to as aerial mapping. This may be done in different ways, for example, by the use of several wide-angle mapping cameras in a high-flying aircraft and differently arranged in known angular relation to each other; these cameras being operated at successive intervals in order to obtain a number of sets of overlapping map sections.

Obviously, the negative film images which have been taken by cameras at different angles of tilt relative to the general plane of the terrain being mapped must be modified or rectified, as by oblique optical projection, in accordance with their respective angles of tilt during the mapping if all parts of each photoprint or the like subsequently obtained are to have correct dimensions and allow abutting edges of adjacent map sections to match properly therewith.

Figure 1:
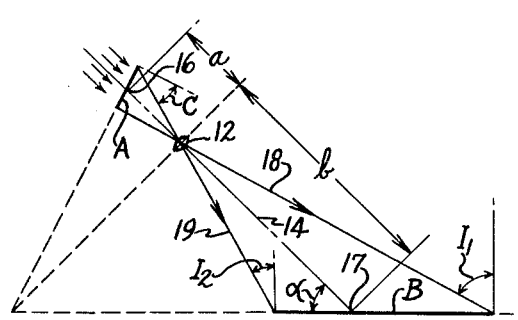
FIG. 1 is a diagram showing an extreme relative positional relation between conjugate focal planes which may be encountered during use of printing apparatus embodying the invention.

In FIG. 1, there is diagrammatically indicated an oblique projection printing condition, such as may be encountered during the rectification printing of an aerial photograph. In this figure, the heavy lines A and B indicate, respectively, the relative positions of an original or negative film carrying an image to be copied at a first focal plane of an objective 12 and of a sensitized sheet material which is to receive the projected image at the second focal plane of said objective. The optical axis 1 of the objective intersects central points in the film and sheet material at axial points 16 and 17 spaced, as indicated by distances $a$ and $b$, to give in this instance approximately a 3.3 to 1 enlargement ratio.

In FIG. 1, the angle of declination formed between the optical axis 14 and the sensitized material is indicated $\alpha$ and may be made, if desired, equal in the angular value to the angle of tilt of the mapping camera at the time of exposure of the film A. From the geometrical arrangement shown by this figure, it will be clear that under such oblique projection conditions certain of the projected marginal image-forming light rays reaching the sheet material B will be even more obliquely disposed.

Thus, for example, light ray 18 incident at the right-hand ends of the sheet material B would have a very high angle of incidence $I_1$. Furthermore, all other light rays incident upon sheet material B have appreciable angles of incidence; the left-hand ray 19 having the smallest angle $I_2$ but even so being of material value insofar as the introduction of optical aberrations into the image being formed is concerned, should a conventional thick glass pressure plate be used upon the sheet material B to hold it flat.

Likewise, emergent light rays from the negative film may at times have image-forming light rays traveling therefrom at angles which may cause optical aberrations should same be required to pass through a thick glass pressure plate. For example, the light ray 19 from the right-hand edge of the negative film A has an appreciable angle C relative to a normal at its point of origin in the film.

Figure 2:
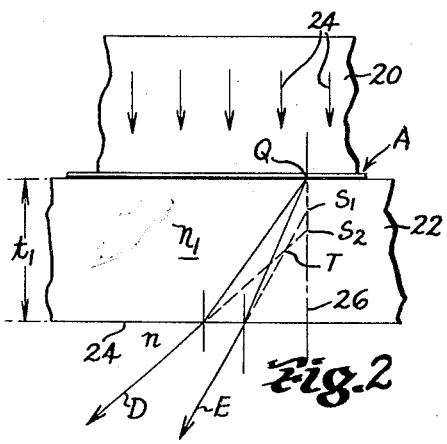
FIGS. 2, 3 and 4 are diagrammatic sketches to aid in describing the invention.

In FIG. 2, enlarged fragmentary portions of a pair of flat glass pressure plates 20 and 22 are shown at opposite sides of the negative film A, as if in an enlarger or printer of the type indicated in FIG. 1, for holding the film precisely flat at the first focal plane of the objective 12. The rear of the film is illuminated in known manner as by light rays 24. If a narrow pencil of light rays from a point of origin in the film, as for example, from the point Q and including the light rays between light rays DQ and EQ, passes through glass pressure plate 22 having a refractive index $N_1$ and enters the air and makes a large angle with the normal at the air-to-glass refractive surface 24, this light will depart radically from the homocentric character desired therein. The light rays travelling beyond the surface 24 will be astigmatic.

This astigmatism can be easily appreciated by considering the extreme refracted rays DQ and EQ of the pencil. For example, if dotted lines from these rays in air are extended without deviation straight back into the glass, these dotted lines will cross a normal 26 from the point of origin Q at different points $S_1$ and $S_2$, respectively, and will intersect each other at point T. This point T, however, is not a vertical point image of the point of origin Q as might at first appear from the sketch of FIG. 2.

Since the angle of refraction at the surface 24 for a given angle of incidence is a constant, it follows that if all of the divergent rays of this pencil in space were likewise extended straight back into the plate 22, they would because of their astigmatic condition, seen to come from two spaced short focal lines lying in planes at right angles to each other; the first line being at T and perpendicular to the plane of the drawing and the second being in the plane of the drawing and extending between points $S_1$ and $S_2$. Thus, this oblique pencil of rays from the single point Q and travelling toward the sheet material B at the second focal plane or copying station of the printer will behave, because of the thickness $t_1$ of the pressure plate 22, as if they came from a plurality of points. At best, they act as if they came from a somewhat blurred image of Q located somewhere between the short focal line $S_1S_2$ and the short focal line T.

Figure 3:
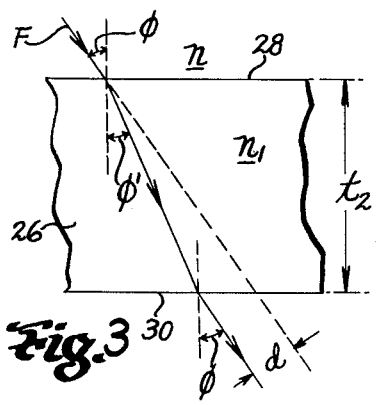

If, as shown at F in FIG. 3, an oblique ray of light is required to traverse a glass plate 26 having plane parallel surfaces 28 and 30 and a thickness $t_2$, it will emerge therefrom in a direction parallel to its original direction but will be laterally displaced by an amount $d$ which is dependent upon its angle of incidence $\varphi$, its angle of refraction $\varphi'$, refractive index $n$ of the first or surrounding medium, the refractive medium $n_1$ of the plate, and the thickness $t_2$ of the plate; and this displacement will increase as the angle of incidence $\varphi$ increases. Thus, the displacement may be expressed as follows:

$$d = t \sin \phi \left( \frac{1 - n \cos \phi}{n^1 \cos \phi'} \right)$$

While for small angles $d$ is nearly proportional to sine $\varphi$, nevertheless, the ratio of the cosines of $\varphi$ and $\varphi'$ soon becomes appreciably less than 1 and causes a somewhat more rapid rate of increase.

If the glass plate 26 in FIG. 3 were in fact a conventional flat pressure plate of appreciable size and accordingly of material thickness being used to overlie the sensitized sheet material B at the copying station of the printer in FIG. 1 operating at a large angle of tilt, light rays near the right-hand edge and particularly those in the outer right-hand corner portions of the sheet material will undergo an objectionable displacement $d$, and the actual lateral shift in a direction parallel to the plane of the paper would be even greater. This lateral shift will introduce a distortion into the print being formed.

Figure 4:
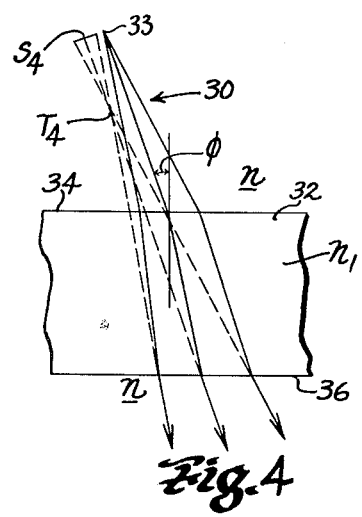

If a divergent pencil of light rays 30, as shown in FIG. 4, is incident on such a plane parallel plate 32 as would be the case if the point of origin 33 in a film carrying an image were removed from the first surface 34 of the pressure plate, it will be seen that the different rays thereof are not incident upon the surface 34 at one and the same angle but at different angles and, therefore, each undergoes a slightly different lateral shift; and, additionally, for parallaxial rays this shift will yield a point image which is shifted a distance $$s = \left( t - \frac{n}{n_1} \right)$$

This result may easily be obtained by applying the equation $$S' = \frac{n'}{n} S$$

successively for the two surfaces of the plate, considering the image due to the refraction at the first surface 34 to be the object for determining the shaft at the second surface 36. When the plate is at an appreciable angle $\varphi$ relative to the divergent pencil, the emergent pencil becomes appreciably astigmatic, because the lateral displacement of all these non-parallel rays are such that their dotted line projections, extended back into the plate and beyond, no longer pass even approximately through a single point. This leads, as in the case of a single refractive surface, to the formation of two virtual focal lines $T_4$ and $S_4$, as discussed above relative to FIG. 2.

Figure 5:
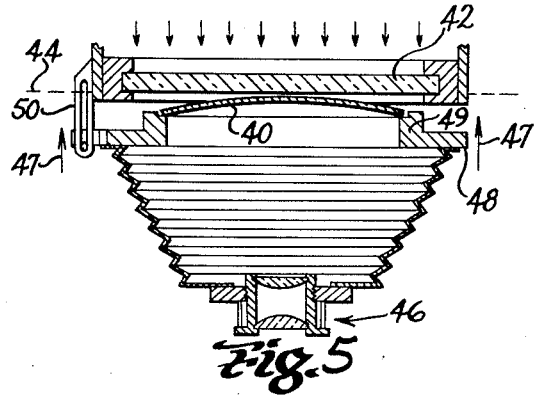
FIG. 5 is a vertical sectional view of one form of pressure-plate means embodying the invention.

The objectionable astigmatism and displacement or distortion previously experienced in conventional rectifying printers using relatively thick pressure plates and operating at relatively large angles of incidence has proved to be a serious drawback in obtaining high degrees of image resolution particularly in outermost corner portions of the print or image. It has been found, however, that the thickness of the pressure plate below the film to be copied and the thickness of the pressure plate upon the sheet material positioned to receive this image when projected, may be very materially reduced and still provide the pressure desired for holding the film or sheet material flat in the following manner. In FIG. 5, for example, a no-power concavo-convexly spherically curved pressure plate 40 is shown for engaging on its convex side the lower side of a negative film (not shown) and for holding same in a flattened condition in engagement with a thicker flat pressure plate 42. At this time, the film will be held in the first focal plane 44 of the objective 46.

Because this no-power pressure plate 40 is spherically curved to a fairly long radius of curvature, it can be made quite thin and still be able to hold any ordinary film flat against the rigid plate 42 when urged upwardly, as indicated by arrows 47, by suitable releasable clamping means, not shown. The plate 40 under these operating conditions will flex appreciably into a more nearly flat condition. Nevertheless, because of its convex spherical shape, thin plate 40 will be much more rigid than it would be otherwise. Accordingly, in this way, the thickness of plate 40 can be materially reduced and this lesser thickness, in turn, will materially reduce the astigmatic and displacement conditions which would otherwise exist. While plate 40 itself will not be perfectly flat, it will still tend to hold the film flat against plate 42.

For convenience, thin plate 40 is carried by a suitable supporting frame 48 having an upstanding recessed plate supporting rim 49 thereon. This frame 48 may be hinged by suitable means 50 for allowing film to be moved into or removed from the space between plates 40 and 42.

Figure 6:
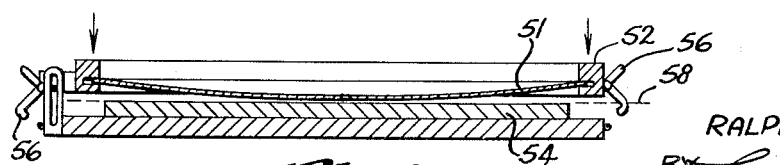
FIG. 6 is a vertical sectional view showing a second form of pressure-plate means embodying the invention.

In a similar manner, a very thin spherically curved transparent pressure plate 51, preferably of glass, is shown in a supporting frame 52 in FIG. 6 for engaging and holding sensitized photographic sheet material (paper or film) in a flattened position upon the back-up plate 54. In this instance, also, the pressure plate and frame are hinged for allowing insertion and removal of the sheet material, and one form of releasable hold-down means is indicated at 56. This means is to insure that the sheet material will be held flat at the second focal plane or image plate 58 of the objective. Of course, when this pressure plate and frame are being held in engagement with the sheet material, plate 51 will be flexed appreciably. The pressure produced thereby, nevertheless, must be sufficient to insure that all parts of the photographic sheet material will be held flat. Thicknesses of and between $1/16$ and $1/8$ of an inch have been used satisfactorily. Even $3/16$ of an inch might be used for very large pressure plates.

Each improved pressure plate should be as thin as possible from a practical standpoint while keeping in mind that it must flex sufficiently to engage a large area of the film or sheet material and develop enough pressure to maintain it in a flattened condition.

The thickness of and amount of sag or concavity required in the improved curved pressure plate to make it practical and to give a sufficient operating pressure will be determined to a large degree by the size of sheet material to be held flat. In practice, it has already been found that a 10 inch by 10 inch spherically curved glass pressure plate adjacent the first focal plane of the printer and a 20 inch by 20 inch spherically curved glass pressure plate adjacent the second focal plane thereof, each having a thickness of approximately $1/16$ inch and radii of approximately 300 and 600 inches respectively will work satisfactorily. Other radii from 200 inches to 800 inches may also be used and still provide thin spherically curved pressure plates giving superior results insofar as freedom from astigmatic and distortion conditions in prints being made by the printer are concerned.

While glass is being described above as being the preferred material for forming the improved transparent pressure plates, and ground and polished glass plates give best results, it might be desirable at times to form such pressure plates by other methods and even of suitable transparent plastics instead of glass. However, in all cases, the plates should be kept as thin as is reasonably possible.

Having described my invention, I claim:

1. A pressure plate for use with a projection printer or the like for holding a piece of flexible photographic sheet material in a flattened condition in engagement with a flat face of a rigid supporting plate of said printer during exposure thereof, said pressure plate being formed of thin transparent material so as to transmit image-forming light rays with a minimum of astigmatism and distortion therethrough, said pressure plate being relatively thin in comparison to its length and width, and having front and rear surfaces in generally parallel relation to each other, and being convexly spherically curved relative to the photographic sheet material to be engaged thereby, said pressure plate having a relatively long radius of curvature of a predetermined value ranging between approximately 200 and 800 inches, whereby when one of said plates is moved toward the other while photographic sheet material is disposed therebetween, the convex surface of said pressure plate will initially engage the photographic sheet material near the center of the image area thereof and will urge same into engagement with the supporting plate, the thickness of said pressure plate relative to its length, width and radius of curvature being such as to allow, as said plates are thereafter urged toward each other, a flexing of said pressure plate and an increase in the area of said sheet material being engaged and flattened thereby.

2. A pressure plate for use with a projection printer or the like for holding a piece of flexible photographic sheet material in a flattened condition in engagement with a flat face of a rigid supporting plate of said printer during exposure thereof, said pressure plate being formed of thin transparent material so as to transmit image-forming light rays with a minimum of astigmatism and distortion therethrough, said pressure plate being relatively thin in comparison to its length and width, and having front and rear surfaces in generally parallel relation to each other, and being convexly spherically curved relative to the photographic sheet material to be engaged thereby, said pressure plate having a relatively long radius of curvature of a predetermined value ranging between approximately 200 and 800 inches and having a thickness ranging between approximately $1/16$ and $3/16$ of an inch, whereby when one of said plates is moved toward the other while photographic sheet material is disposed therebetween, the convex surface of said pressure plate will initially engage the photographic sheet material near the center of the image area thereof and will urge same into engagement with the supporting plate, the thickness of said pressure plate relative to its length, width and radius of curvature being such as to allow, as said plates are thereafter urged toward each other, a flexing of said pressure plate and an increase in the area of said sheet material being engaged and flattened thereby.

3. A pressure plate for use with a projection printer or the like for holding a piece of flexible photographic sheet material in a flattened condition in engagement with a flat surface of a rigid supporting plate during exposure of the light-sensitive emulsion on said sheet material, said pressure plate being in the form of a meniscus element formed of transparent material so as to allow image-forming light rays for exposing said emulsion to pass therethrough, and having front and rear spherically curved surfaces thereon disposed in generally parallel relation to each other, said pressure plate being relatively thin in comparison to its length and width, and having its front and rear curved surfaces each of a relatively very long radius of spherical curvature in comparison to said length and width so as to render said pressure plate relatively flexible and to reduce to a minimum the optical aberrations of distortion and astigmatism in the image-forming light rays passing therethrough, the thickness of said pressure plate relative to its length, width and radius of curvature being such as to allow the central portions of said pressure plate to flex and provide an appreciable increase in the amount of surface area on the convex side of said pressure plate in contact with said photographic sheet material when peripheral parts of said pressure plate on the concave side thereof are pressed to urge said pressure plate into intimate engagement with said sheet material in engagement with said flat supporting surface, whereby an appreciable area of said flexible sheet material near the center thereof may be held in a flattened position against said flat supporting surface during exposure thereof.

References Cited in the file of this patent

UNITED STATES PATENTS

| 1,338,894 | Younkin | May 4, 1920 |
| 2,054,586 | Mayer | Sept. 15, 1936 |
| 2,335,326 | Walter | Nov. 30, 1943 |
| 2,629,283 | Zobel | Feb. 24, 1953 |
| 2,652,757 | Robbins | Sept. 22, 1953 |
| 2,807,199 | Alberti | Sept. 24, 1957 |

FOREIGN PATENTS

| 1,013,893 | Germany | Aug. 14, 1957 |